United States Patent [19]

Tolliver

[11] Patent Number: 4,467,995

[45] Date of Patent: Aug. 28, 1984

[54] SPACER BAR AND RELATED METHOD FOR CONCRETE PIPE MANUFACTURE

[76] Inventor: Wilbur E. Tolliver, 364 Hamilton Dr., Holland, Mich. 49423

[21] Appl. No.: 288,309

[22] Filed: Jul. 30, 1981

Related U.S. Application Data

[62] Division of Ser. No. 56,602, Jul. 11, 1979, Pat. No. 4,295,501.

[51] Int. Cl.³ .................... F16L 55/00

[52] U.S. Cl. .................... 249/160; 138/175; 245/2; 249/83

[58] Field of Search .................... 138/175; 140/92.1, 107; 52/661, 662, 664, 669, 676, 687, 688; 139/386, 387 R, 425 R; 245/1, 2; 425/63, 175; 249/83, 117, 160

[56] References Cited

U.S. PATENT DOCUMENTS

| | | | |
|---|---|---|---|
| 1,826,043 | 10/1931 | Bitney | 52/687 X |
| 1,855,807 | 4/1932 | Older | 138/175 |
| 1,871,809 | 8/1932 | Lampert | 52/688 |
| 1,896,279 | 2/1933 | Bitney | 52/687 X |
| 3,289,378 | 12/1966 | Carroll | 52/688 |
| 3,440,792 | 4/1969 | Schmidgall | 138/175 X |
| 3,840,054 | 10/1974 | Tolliver | 245/2 X |

FOREIGN PATENT DOCUMENTS

| | | | |
|---|---|---|---|
| 403254 | 6/1966 | Switzerland | 52/688 |

*Primary Examiner*—James E. Bryant, III

*Attorney, Agent, or Firm*—Price, Heneveld, Huizenga & Cooper

[57] ABSTRACT

A method, apparatus and resulting assembly wherein a concrete pipe reinforcing cage assembly is spaced from the walls of a pipe-making form by means of several spacer bars, each comprising a tie rod to which are secured a plurality of links. The spacer bars are inserted into the case assembly with the links projecting generally radially therefrom and the resulting final assembly is inserted into the pipe form with the ends of the spacer links engaging the pipe form and spacing the cage assembly therefrom.

3 Claims, 12 Drawing Figures

SPACER BAR AND RELATED METHOD FOR CONCRETE PIPE MANUFACTURE

This is a divisional of application Ser. No. 56,602, filed July 11, 1979, now U.S. Pat. No. 4,295,501.

BACKGROUND OF THE INVENTION

The present invention relates to manufacturing welded wire reinforced concrete pipe, specifically to spacing the welded wire reinforcement assembly from the pipe form during the operation wherein concrete is formed around the wire reinforcement.

A wire reinforcing assembly typically comprises at least a generally cylindrical wire reinforcing cage. Sometimes, it includes inner and outer cages. This cage usually has a plurality of longitudinal wires running lengthwise thereof and a plurality of generally circumferential wires joined to the longitudinal wires and being generally parallel to one another. Sometimes, additional reinforcement in the form of stirruping or quadrant reinforcing is added to the cage assembly.

Once the cage assembly is completed, it is placed in a pipe form. A single external wall form is used when the pipe is formed in a packer head machine and a double wall form is utilized when concrete is to be cast around the cage.

Spacers have to be secured to the cage assembly in order to space it from at least one of the form walls. Typically, a short steel rod is welded or otherwise secured to the reinforcing cage to serve as a spacer. A plurality of such rods are secured to the cage at spaced points along the length and around the circumference of the cage. Plastic spacers are also available which snap onto the cage at various points.

In the case of either type of spacer, it is very time-consuming to secure the spacers to the pipe reinforcing cage. Yet, this is an important operation in that if the wire reinforcing cage gets too close to a form wall, it will protrude through the concrete at the surface of the concrete pipe wall. Such protrusion results in rejection of the pipe since it would not conform to engineering standards.

SUMMARY OF THE INVENTION

In the present invention, the time involved in positioning spacers within the pipe reinforcing cage is greatly reduced by the provision of a spacer bar comprised of an elongated tie rod member having a plurality of spacer links joined thereto at various points along the length thereof and oriented generally parallel to one another. Several such spacer bars are placed in the cage at points around its circumference with the links projecting through the cage towards a form wall when the cage is located in position with respect to the form. The cage is located within the form with the links of the spacer bars engaging the form wall to hold the cage in properly spaced relationship with respect to the form.

These and other aspects, features and advantages of the invention will be more fully understood and appreciated by reference to the written specification and appended drawings.

DESCRIPTION OF THE PREFERRED EMBODIMENTS

Figure 2:
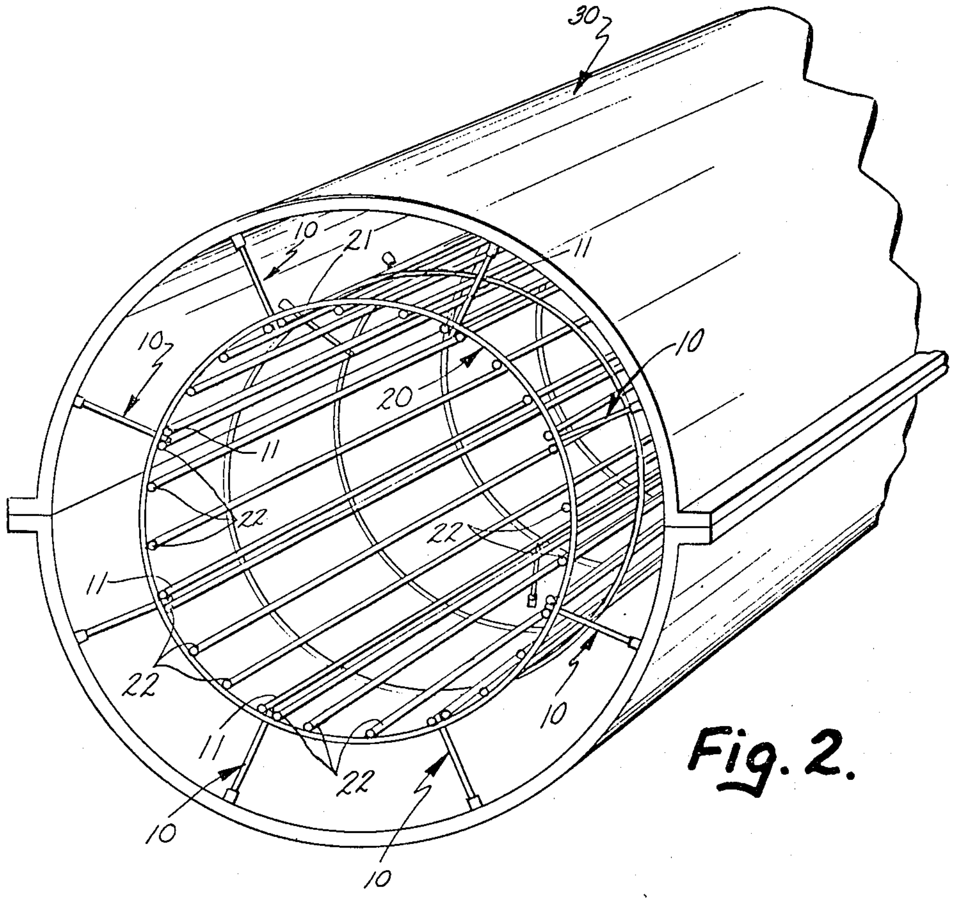
FIG. 2 is an end perspective view of a pipe reinforcing cage held in place within a pipe form by means of spacer bars made in accordance with the present invention.
Figure 1:
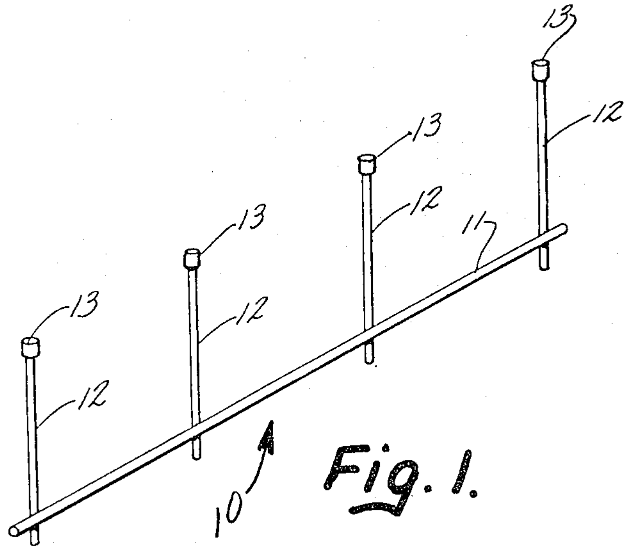
FIG. 1 is a perspective view of a fragmentary portion of a spacer bar made in accordance with the present invention.

In the preferred embodiment as illustrated in the alternative of FIG. 1, the spacer bar 10 of the present invention preferably comprises an elongated tie rod 11 to which are joined a plurality of spaced links 12 which are generally parallel to one another and which are preferably tipped with a plastic cap 13. A plurality of such spacer bars 10 are secured to a cage 20 at spaced points about its circumference with the spacer links 12 projecting generally radially therefrom towards the pipe form wall 30 (FIG. 2). Cage 20 might be located within pipe form 30 either before or after spacer bars 10 are secured thereto. Spacer bars 10 are secured in place in cage 20 by any of several alternative conventional means, as for example by tack welding at several points along the length of each spacer bar or by the use of several hog ring fasteners or the like.

Each tie rod 11 and each spacer bar 10 is sufficiently long that several spaced links 12 can be secured thereto. Preferably, spacer bar 11 is approximately the length of the pipe to be formed. Such pipe typically comes in approximately eight foot sections or "joints". For forming such pipe, there would be anywhere from 3 to about 6 spacer links 12 spaced approximately equidistant along the length of each tie rod 11.

Tie rod 11 can be made of any relatively stiff wire, and the type typically used to form concrete pipe reinforcing cages is satisfactory. I prefer brite basic wire having a diameter of 0.142 to approximately 0.500. Spacer links 12 can be made from the same material as tie rod 11. A relatively stiff, rigid material must be used in order to insure that links 12 don't bend and thereby cause cage 20 to shift towards one or the other side of the pipe form 30.

Figure 3:
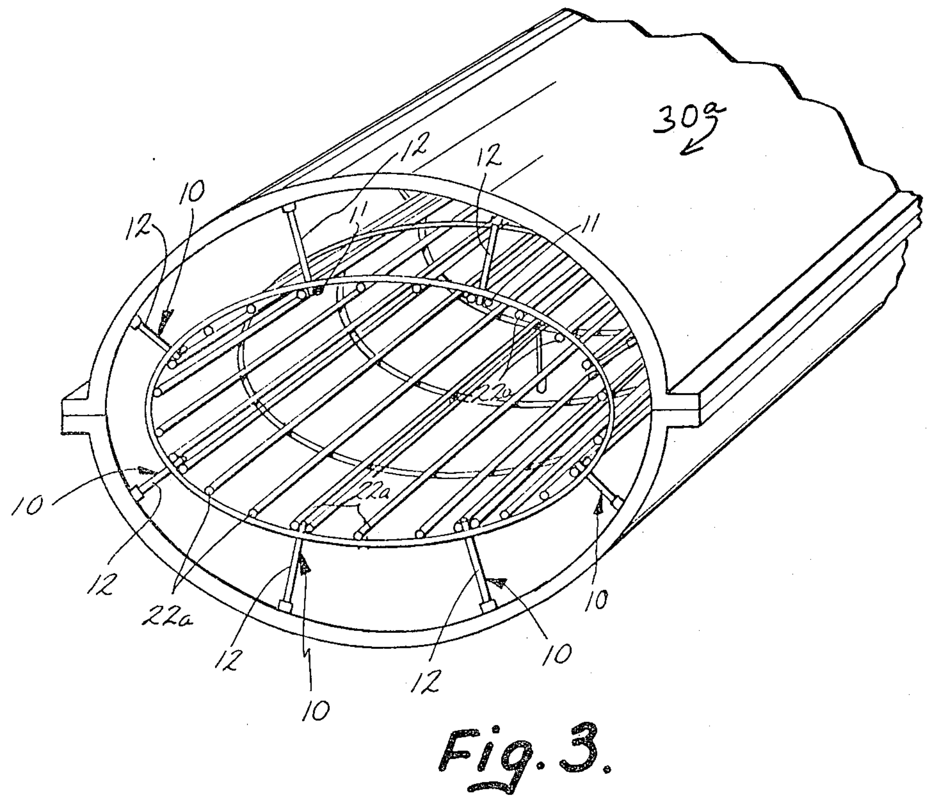
FIG. 3 is similar to FIG. 2 except that the pipe reinforcing cage is not equidistant to the wall of the pipe form at all points.

The length of the links 12 in each spacer bar 10 will vary depending on the distance which cage 20 is to be spaced from the surface of its adjacent form wall 30. Further, spacer bars 10 having links 12 of different lengths might be employed in spacing the same cage from a form wall. FIG. 3 illustrates this principle wherein an eliptical cage **20*a* is spaced from an eliptical pipe form wall 30*a* and wherein the cage 20*a* is not equidistant from form wall 30*a* at all points. Thus, spacer bars 10 having links 12 of differing length are employed at various points around the circumference of eliptical cage 20*a***.

In both FIG. 2 and FIG. 3, the spacer bars 10 are secured to their respective reinforcing cages 20 and **20*a* with the links 12 projecting through the cages. That is the preferred method for assembling the spacer bars 10 to the cages in that each of the links 12 can be butted up against a cage longitudinal wire 22 to lend stability to the radially projecting link 12. The longitudinal wires 22 or 22*a* are joined to circumferential wires 21 or 21*a* as is conventional. By tack welding or otherwise securing spacer bars 10 to cage 20 or 20*a* such that some of the links 12 are welded or rigidly secured to adjacent longitudinals 22 or 22*a* and tie rod 11 is welded to at least some circumferential wires 21 or 21*a***, one achieves a rigid assembly.

The plastic caps 13 covering the end of each spacer link 12 can be made of any relatively inexpensive plastic material which is sufficiently sturdy to stay affixed to the end of each link 12 during the concrete forming operation. The purpose of the plastic caps 13 is to prevent the ends of links 12 from rusting and the resulting rust staining the exterior wall of a concrete pipe formed with spacer bars 10 in place.

Figure 4:
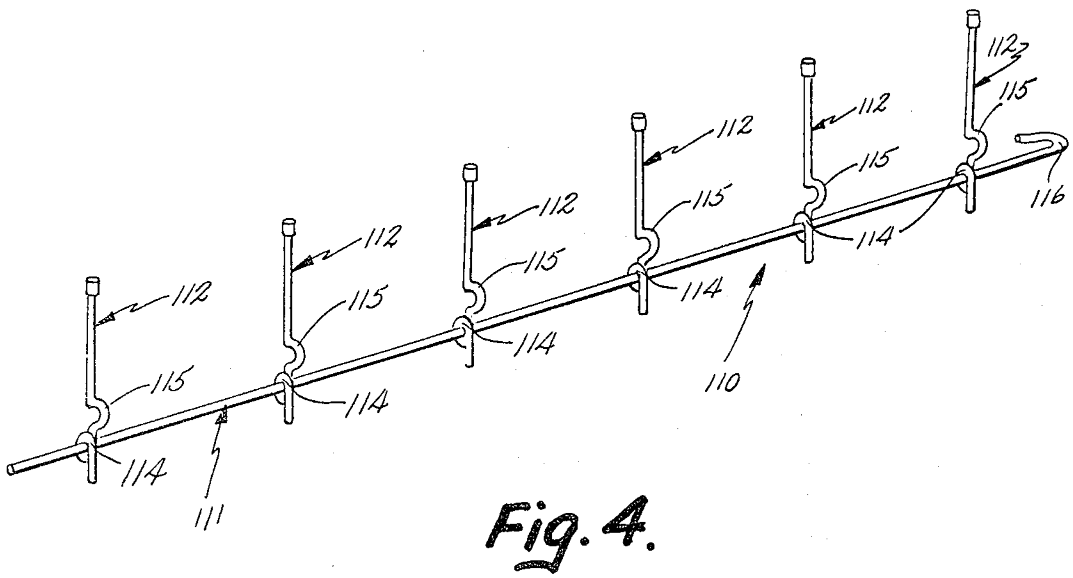
FIG. 4 is a perspective view of an alternative embodiment spacer bar made in accordance with the present invention.

FIG. 4 discloses an alternative embodiment spacer bar 110 which has two important variations over spacer bar 10. First, each link 112 is slidably mounted on tie rod 111. This is accomplished by forming a loop 114 around tie rod 111. Secondly, each link 112 is formed with a hookshaped deviation 115 therein. Deviations 115 all lie approximately in a plane passing through tie rod 111.

Figure 5:
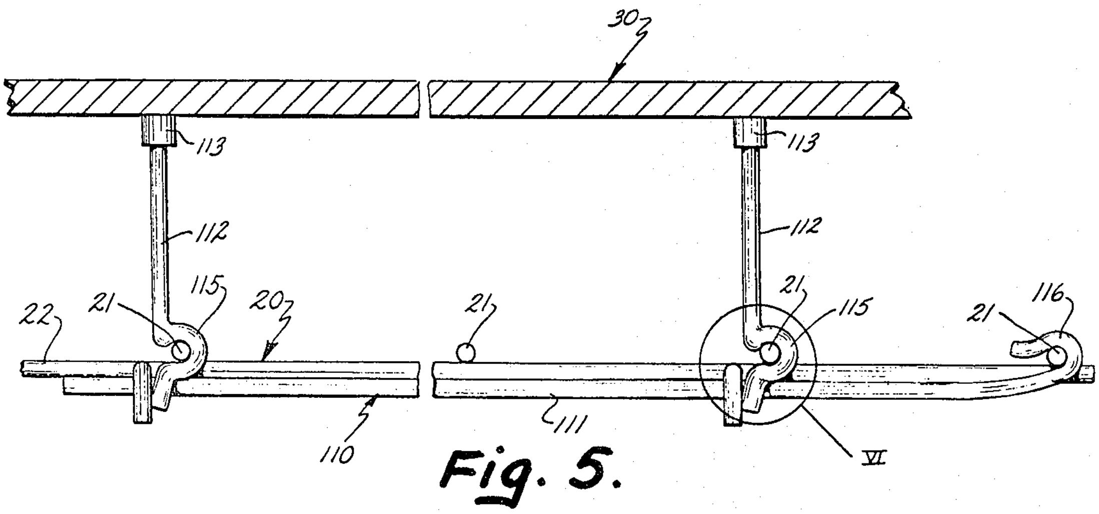
FIG. 5 is a fragmentary, cross sectional view taken lengthwise of a pipe form and showing the FIG. 4 embodiment spacer bar being used to locate a cage within the pipe form.
Figure 6:
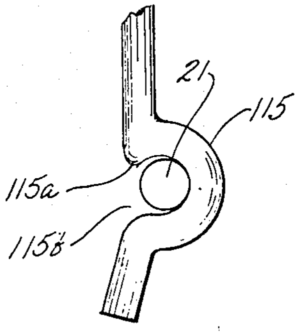
FIG. 6 is an enlarged, fragmentary view of the encircled area VI shown in FIG. 5.

By reason of these variations, a spacer bar 110 can be secured to a cage 20 with links 112 projecting through cage 20 and with hooks 115 hooked over the circumferential wires 21 of cage 20 (FIG. 5). Links 112 can be slid along tie rod 111 until located adjacent a circumferential wire 21 and the hooks 115 can then be snapped over an adjacent circumferential wire 21. The plastic cups 113 on each link 112 would then engage the pipe form wall 30 as previously described. Referring to FIG. 6, it will be noted that each hook 115 has an opening just slightly smaller than the diameter of the circumferential wire 21 over which it is to hook. Further, each hook 115 is shaped to conform closely to the diameter of a circumferential wire 21. In this way, as hook 115 snaps over circumferential wire 21, it will positively lock in place thereon and will fit snugly thereon. It will be seen that each of the leading edges of the opening of hook 115 is rounded slightly as at **115*a* and 115*b* so that each hook 115 snaps more easily over a circumferential wire 21**.

Alternative embodiment spacer bar 110 also has another feature not included in spacer bar 10, i.e. a tail hook 116 formed on the end of tie rod 111. As seen in FIG. 5, tail hook 116 hooks over an end circumferential wire 21 to positively hold tie rod 111 in place within cage 20. Tail hook 116 is shaped in a manner comparable to hook 115 so that it too snaps easily over a circumferential wire 21 and fits snugly thereon once in place.

Figure 7:
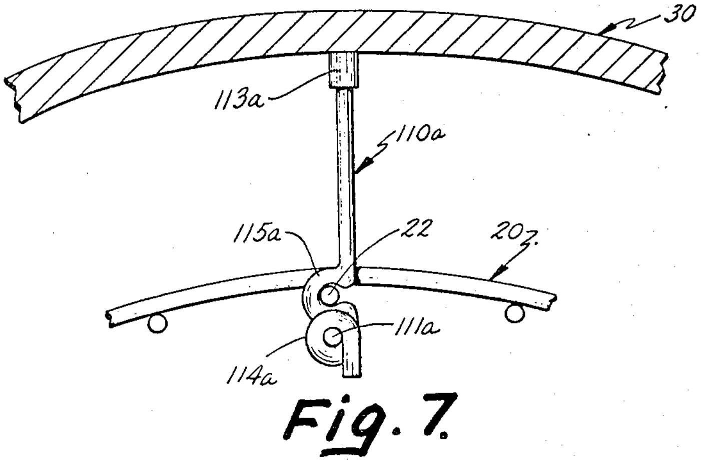
FIG. 7 is a fragmentary, lateral cross sectional view of a cage located within a pipe form by means of an alternative embodiment variation of the FIG. 4 spacer bar.

FIG. 7 discloses an alternative embodiment spacer bar **110*a* in position spacing a cage 20 from a pipe form 30. Alternative embodiment 110*a* is very similar to embodiment 110 except that each of the hooks 115*a* of spacer bar 110*a* are oriented generally laterally with respect to a plane passing through tie rod 111, rather than being oriented generally parallel thereto as are the hooks 115 in spacer bar 110. In all other respects, the various components of spacer bar 110*a* are identical to those of spacer bar 110 and are numbered with the same number with the letter "a" added as a suffix. In use the hooks 115*a* of spacer bar 110*a* are hooked over longitudinal wires 22 of cage 20, rather than being hooked over circumferential wires 21**.

Figure 8:
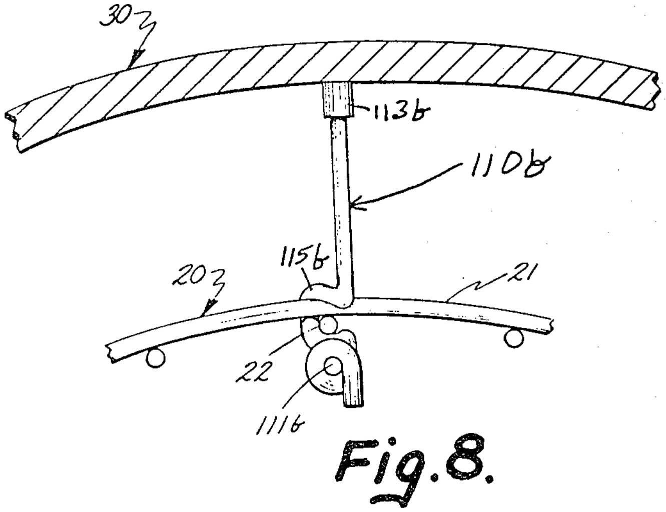
FIG. 8 is a view similar to FIG. 6 showing yet another alternative embodiment spacer bar used to space the cage assembly from the pipe form wall.

FIG. 8 discloses yet another alternative embodiment spacer bar **110*b* which is identical to spacer bars 110 and 110*a* except that its hook deviation 115*b* is slightly larger than the hook deviations 115 and 115*a* and its hook deviations 115*b* are oriented at an angle of approximately 45 degrees with respect to a plane passing through its tie rod 111*b*. Hook 115*b* is designed to simultaneously hook over both a circumferential wire 21 and a longitudinal wire 22 of cage 20. Again, the various similar components of spacer bar 110*b* are numbered identically to those of spacer bars 110 and 110*a*** except that the suffix letter "b" is added.

Figure 9:
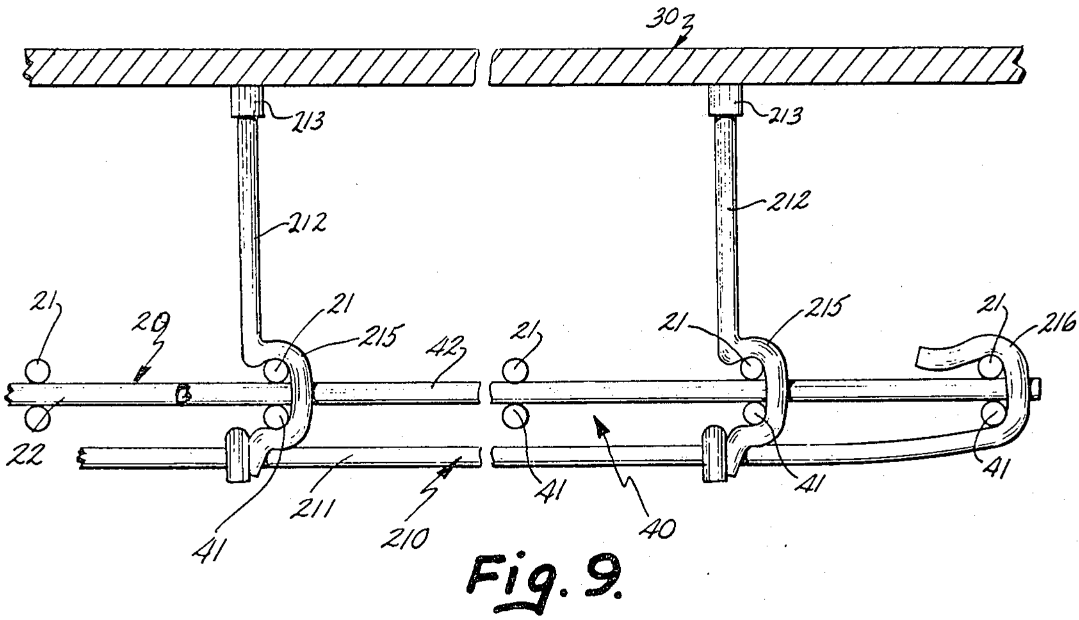
FIG. 9 is a view similar to FIG. 5 except that another alternative embodiment spacer bar is employed which is used not only to space the cage assembly from the pipe form wall, but also to join a quadrant reinforcing mat into the cage assembly.

FIG. 9 discloses yet another alternative embodiment spacer bar 210 which is designed not only to space a pipe reinforcing cage 20 from the wall of a pipe form 30, but which is also designed to simultaneously hold a quadrant reinforcing mat 40 in position against cage 20. In FIG. 9, the longitudinally extending strand 42 of quad mat 40 is shown in position in front of longitudinal strand 22 of cage 20 and is broken away short of the break point of longitudinal 22 so that both can be identified in FIG. 9. The circumferential strands 21 of cage 20 lie to the outside of longitudinal strands 22 while the arcuate circumferentially oriented strands 41 of quad mat 40 are oriented to the opposite side of cage 20 and mat 40 from circumferential strands 21. Quad mats 40 can be produced in any of the currently known ways and may include stirrup projections joined thereto for projecting radially with respect to cage 20.

Spacer bar 210 is very similar to spacer bar 110 and its various components have the same last two numbers preceded by a "2" as to the similar components in spacer bar 110. The key difference is that each hook deviation 215 has a sufficiently wide opening that it will snap over both a circumferential strand 21 of cage 20 and a circumferentially oriented strand 41 of quadrant reinforcing mat 40. In this way, each spacer bar 210 not only spaces the cage assembly (here broadly comprised of cage 20 and quadrant reinforcing mats 40) from the wall of pipe form 30, but also serves to secure quad mat 40 to cage 20.

In a similar manner, tail hook 216 is sufficiently large that it hooks over both a circumferential wire 21 of cage 20 and a circumferentially oriented wire 41 of quad mat 40.

Figure 10:
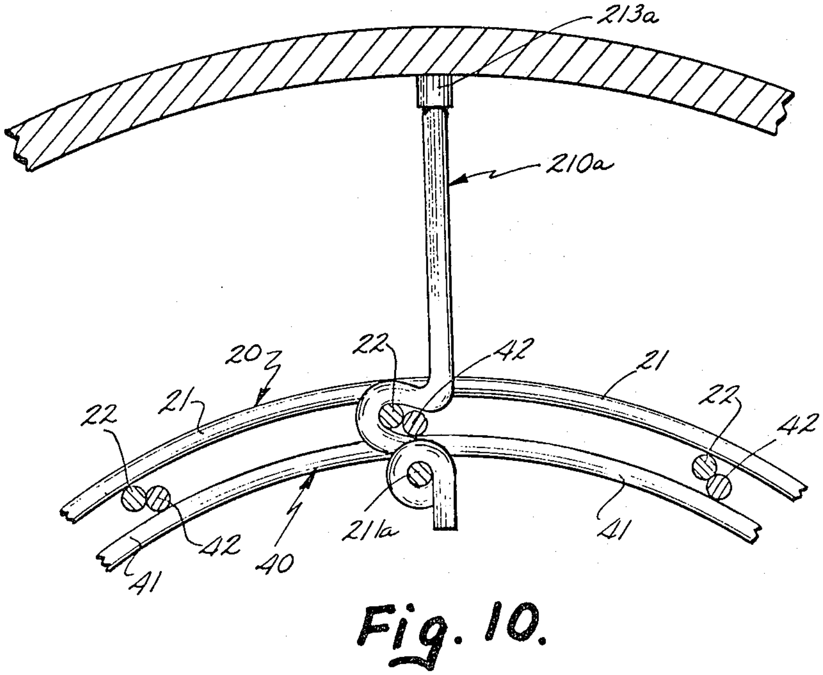
FIG. 10 is a view similar to FIG. 6 except that it shows yet another alternative embodiment spacer bar which is used not only to space the cage assembly from the form wall, but also to secure quadrant reinforcement in place.

FIG. 10 discloses a spacer bar 210*a* which is a variant of spacer bar 210. Comparable components are numbered with the same number as the components of spacer bar 210 except that the suffix "a" is added. The primary difference is that each securing hook 215*a* is oriented laterally of a plane passing through tie rod 211*a* rather than being oriented in the plane thereof as in the case of securing hook 215 of spacer bar 210. Further, each hook 215*a* is shaped somewhat differently in that it is deeper from front to back but shorter from top to bottom. In this way, each hook 215*a* hooks over a pair of adjacent longitudinally oriented wires to secure a pipe reinforcing quadrant mat 40 to a cage 20. Specifically, hook 215*a* hooks over both a longitudinal strand 22 of cage 20 and an adjacent longitudinal strand 42 of quad mat 40.

Figure 11:
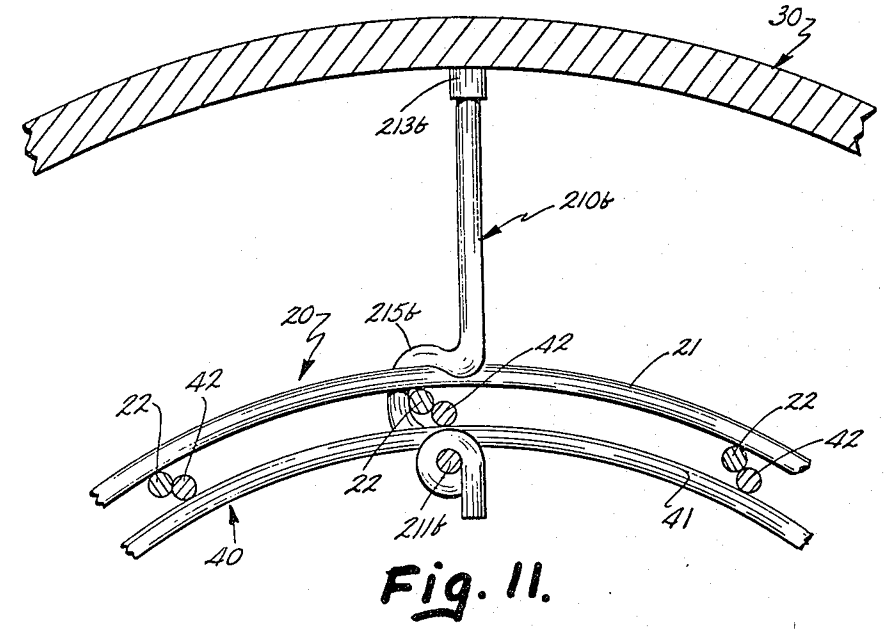
FIG. 11 is another view similar to FIG. 9 except that yet another alternative embodiment spacer bar is shown for not only spacing the cage assembly from the form wall, but also for securing a quadrant reinforcing mat in place.

FIG. 11 discloses an alternative embodiment spacer bar 210*b* which is identical to spacer bars 210 and 210*a* except that its hook deviations 215*b* are oriented at a 45 degree angle with respect to a plane passing through its tie rod 211*b*. Further, the opening of each hook 215*b* is designed to hook over at least one circumferential strand 21 or 41 of either cage 20 or quad mat 40 and a longitudinal strand 42 or 22 of the other. As shown in FIG. 11, hook 215*b* is shaped so as to capture both a circumferential wire 21 of cage 20 and the longitudinal strand 42 of quad mat 40 as well as the longitudinal strand 22 of cage 20. Yet another variation would be to design hook 215*b* such that it would hook over both longitudinal wires 22 and 42 and both circumferential wires 21 and 41.

Figure 12:
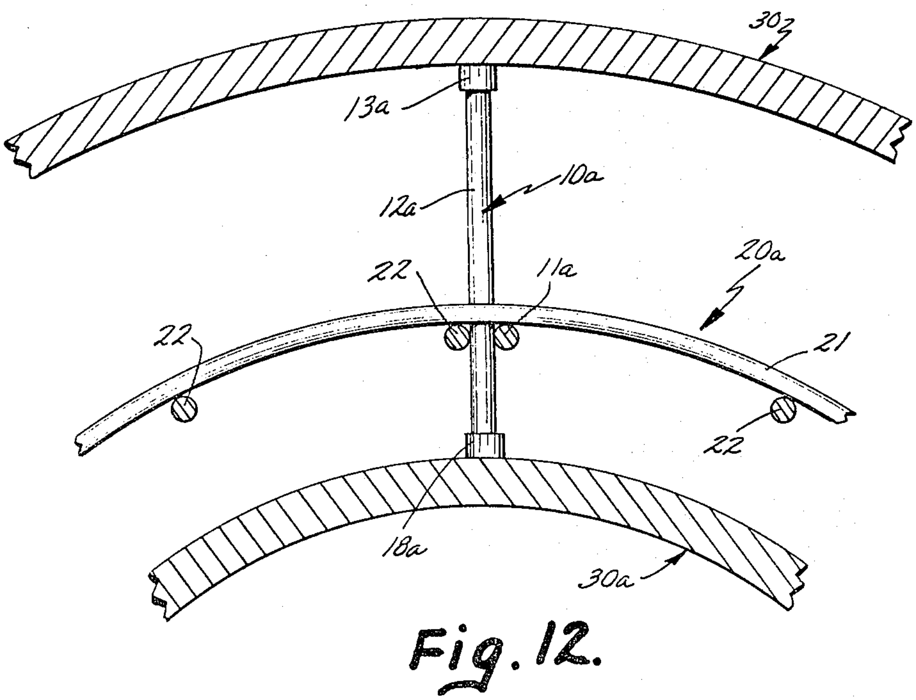
FIG. 12 is a fragmentary lateral cross sectional view showing yet another alternative embodiment spacer bar used to space a cage from both an inside and outside pipe form wall.

Finally, FIG. 12 discloses an alternative embodiment spacer bar 10*a* which is identical to spacer bar 10 except that its link 12*a* projects downwardly below its tie rod 11*a* a substantial distance and includes a plastic cup 18*a* thereon, located at the end of link 12*a* opposite plastic cap 13*a*. Each link 12*a* has a length which is equal to the desired spacing between an inside pipe form wall 30*a* and an outside pipe form wall 30. This illustrates the fact that any of the alternative embodiment spacer bars described above could be employed to achieve spacing only from an inside pipe form wall 30*a* or from an outside wall only or from both an inside and an outside pipe form wall. Naturally, some of these variations would not be applicable in situations where the pipe is to be made from a packer head machine which employs only an outside pipe form wall.

Of course, it is understood that the above are merely preferred embodiments of the invention and that various changes and alterations can be made without departing from the spirit and broader aspects thereof as set forth in the appended claims which are to be interpreted in accordance with the principles of patent law.

The embodiments of the invention in which an exclusive property or privilege is claimed are defined as follows:

1. An assembly for casting concrete pipe comprising:

a generally cylindrical reinforcing wire cage, said cage including generally circumferentially oriented wire reinforcement and generally longitudinally oriented wire reinforcement;

a generally cylindrical concrete pipe form spaced outwardly from said cage;

a plurality of spacer bars, each having a tie rod and a plurality of links joined to and spaced along the length of said tie rod generally parallel to one another;

said spacer bars being secured to said cage at spaced points around the entire circumference thereof with said links projecting generally radially therefrom and contacting the inside surface of said form to hold said cage in properly spaced relationship with respect to said pipe form.

2. The casting assembly of claim 1 wherein each of said links includes a plastic tip on that end thereof which engages a pipe form.

3. The cage assembly of claim 1 wherein each of said spacer bars is oriented with said links projecting through said cage assembly.

* * * * *